(12) United States Patent
Vincent et al.

(10) Patent No.: US 7,841,384 B2
(45) Date of Patent: Nov. 30, 2010

(54) LOCAL SEAL CASING OF THE "MAZE" TYPE, FOR A PASSENGER COMPARTMENT HEATING, VENTILATION AND/OR AIR CONDITIONING INSTALLATION

(75) Inventors: Philippe Vincent, Epernon (FR); Thomas Carton, Maurepas (FR); Gilbert Terranova, Le Perray en Yvelines (FR)

(73) Assignee: Valeo Climatisation, La Verriere (FR)

( * ) Notice: Subject to any disclaimer, the term of this patent is extended or adjusted under 35 U.S.C. 154(b) by 944 days.

(21) Appl. No.: 11/136,932

(22) Filed: May 25, 2005

(65) Prior Publication Data
US 2005/0279484 A1 Dec. 22, 2005

(30) Foreign Application Priority Data
Jun. 21, 2004 (FR) .................................. 04 06720

(51) Int. Cl.
*F24F 13/30* (2006.01)
(52) U.S. Cl. .......................................... 165/78; 165/76
(58) Field of Classification Search .................. 165/76, 165/78
See application file for complete search history.

(56) References Cited

U.S. PATENT DOCUMENTS

| | | | | |
|---|---|---|---|---|
| 4,328,859 A | * | 5/1982 | Bouvot | 165/78 |
| 4,465,124 A | * | 8/1984 | Jacquet et al. | 165/67 |
| 4,903,762 A | * | 2/1990 | Marsais et al. | 165/149 |
| 5,219,017 A | * | 6/1993 | Halstead et al. | 165/41 |
| 5,662,162 A | * | 9/1997 | Fukuoka et al. | 165/41 |
| 5,819,841 A | * | 10/1998 | Moynat | 165/78 |
| 6,470,961 B1 | * | 10/2002 | Case | 165/78 |

FOREIGN PATENT DOCUMENTS

| | | |
|---|---|---|
| DE | 196 54 776 | 7/1998 |
| DE | 19654776 A1 * | 7/1998 |
| DE | 102 42 899 | 4/2003 |
| EP | 1 239 255 | 9/2002 |

* cited by examiner

*Primary Examiner*—Allen J Flanigan
(74) *Attorney, Agent, or Firm*—Howard & Howard Attorneys PLLC

(57) ABSTRACT

A casing (1) is dedicated to housing a heat exchanger (3) in a heating, ventilation and/or air conditioning installation, for example of a motor vehicle. The heat exchanger (3) comprises an air inlet face (12), an air outlet face (13), a rear end face (15), a front end face (14), and at least one side face (16, 17) capped with a radiator tank (4, 5). The casing (1) comprises side walls (18, 19) defining at least one housing to receive at least one part of the radiator tank (4, 5). Furthermore, each side wall (18, 19), defining a housing, comprises first (21, 22) and/or second (23, 24) primary parts intended to be respectively placed opposite radiator tank side faces, substantially parallel to the inlet face (12) and/or outlet face (13), and each radiator tank (4, 5) comprises on its side faces first (25, 26) and second (27, 28) secondary protruding parts, the first and/or second primary parts and the corresponding first and/or second secondary parts being respectively shaped so as to define together a duct (29, 30; 31, 32) constraining an air flow to change direction at least three times, so that the circulation of the air flow is limited in the whole of the duct (29, 30; 31, 32).

11 Claims, 4 Drawing Sheets

Figure 1:
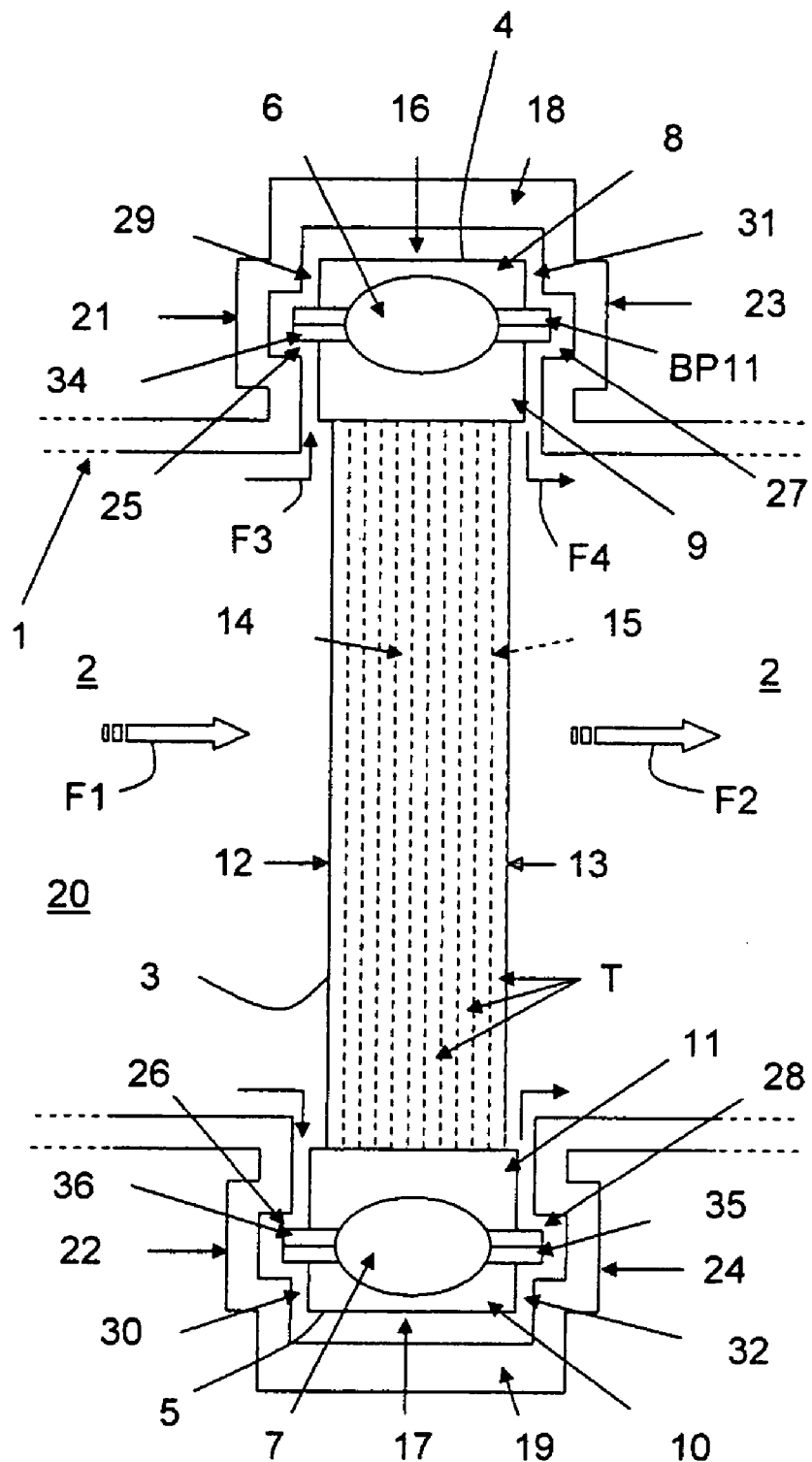

LOCAL SEAL CASING OF THE "MAZE" TYPE, FOR A PASSENGER COMPARTMENT HEATING, VENTILATION AND/OR AIR CONDITIONING INSTALLATION

The invention relates to the field of passenger compartment heating, ventilation and/or air conditioning installations, particularly of motor vehicles, and more precisely the casings of such installations, intended to house a heat exchanger.

As is known to those skilled in the art, because of the production tolerances of heat exchangers, the housings intended to receive them within the casings of the aforementioned type are overdimensioned. This overdimensioning is particularly great when the heat exchanger is of the type called "I-flow", that is to say when it comprises two radiator tanks separated from one another by a core of tubes in which a heat transfer fluid circulates in a single direction.

Because of this overdimensioning, a part of the air flow which reaches the inlet face of a heat exchanger may penetrate the free spaces defined between each radiator tank that the heat exchanger comprises and the walls of the casing which delimit the housing in which it is installed. This part of the air flow may thus travel around each radiator tank and come to disrupt the air flow treated by the heat exchanger and coming out through its outlet face.

To attempt to remedy this drawback, it has been proposed to seal the housings of the casings, particularly in the region or regions in which the radiator tank or tanks is/are installed, for example by means of fitted foam seals (usually made of polyurethane (PU)).

Thanks to these seals, a good seal may be provided in new condition. However, when these fitted seals age, their properties and performance tend to deteriorate (compaction, crumbling), so that they are no longer capable of providing the initial seal. This results in a loss of thermal power and therefore a loss of thermal comfort inside the passenger compartment of the vehicle.

Furthermore, when the radiator tanks are situated outside the casing, their production tolerances and the tolerance linked to the introduction of the core of tubes into the radiator tanks do not disrupt the attachment of the heat exchangers. But, when one or two radiator tanks are situated inside the casing there are one or two times more tolerances to be taken into account.

The aim of the invention is therefore to improve the situation, particularly in the case of I-flow heat exchangers.

For this purpose it proposes a casing for housing, in a heating, ventilation and/or air conditioning installation, particularly of a motor vehicle, a heat exchanger comprising air inlet and outlet faces, front and rear end faces, and at least one side face capped with a radiator tank, and the casing comprising side walls defining at least one housing intended to receive at least one part of the radiator tank.

This casing is characterized by the fact that, on the one hand, each side wall, defining a housing, comprises first and/or second primary parts intended to be respectively placed opposite radiator tank side faces, substantially parallel to the inlet and/or outlet face of the heat exchanger, and that, on the other hand, each radiator tank of the heat exchanger comprises on its side faces first and/or second secondary protruding parts, the first and/or second primary parts and the corresponding first and/or second secondary parts being respectively shaped so as to define together a duct constraining an air flow to change direction at least three times, so that the circulation of the air flow is limited in the whole of the duct.

The speed of the air flow within each escape zone being notably slowed due to the narrowness of the ducts and the multiple changes of direction (induced by the "maze" effect), the larger part of the air flow to be treated, which has a much higher speed, is therefore constrained to pass through the heat exchanger rather than penetrate the maze, thus ensuring a substantially constant seal over time.

Several different embodiments may be envisaged and in particular:
- only each first primary part and each corresponding first secondary part may be respectively shaped so as to define two by two a duct constraining the air flow to change direction at least three times,
- only each second primary part and each corresponding second secondary part may be respectively shaped so as to define two by two a duct constraining the air flow to change direction at least three times,
- each of the first and second primary parts and each of the corresponding first and second secondary parts may be respectively shaped so as to define two by two a duct constraining the air flow to change direction at least three times,
- the first and/or second primary parts may extend substantially over the whole length of the inlet and outlet faces,
- the first and/or second secondary parts may extend substantially over the whole length of the inlet and outlet faces,
- the casing may comprise a rear end wall defining two housings each suitable for receiving a rear end part of one of the radiator tanks. In this case, the rear end part of each of the radiator tanks may be shaped on the side of the rear end face, and the rear end wall and each rear end part are respectively shaped so as to define together a duct constraining the air flow to change direction at least three times, so that the circulation of the air flow is limited in the whole of the duct,
- when the radiator tanks each comprise a peripheral edge, the first and/or second secondary parts and/or the rear end parts may be protruding parts of the peripheral edges. In this case, the protruding parts of the peripheral edges may comprise a first part substantially perpendicular to the radiator tank side faces and extended by a second part substantially parallel to the radiator tank side faces.

Figure 2:
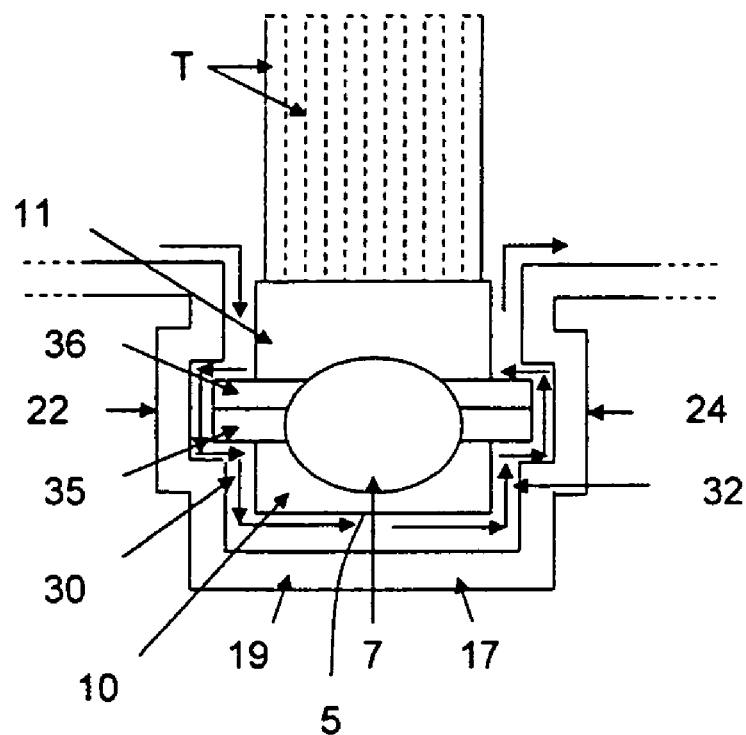
Figure 3:
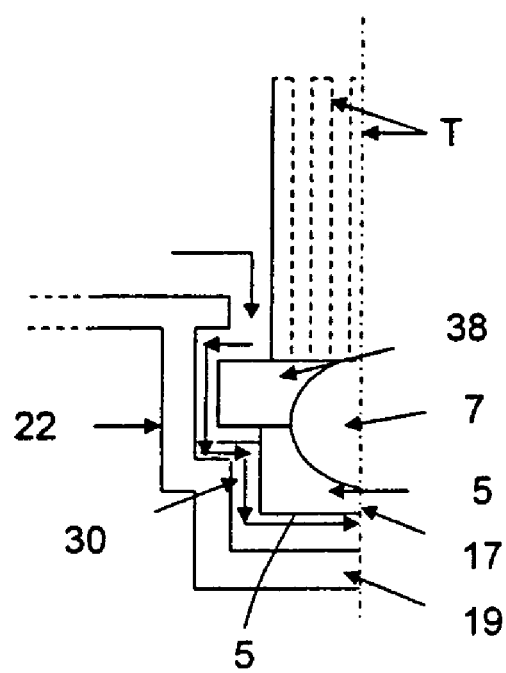
Figure 4:
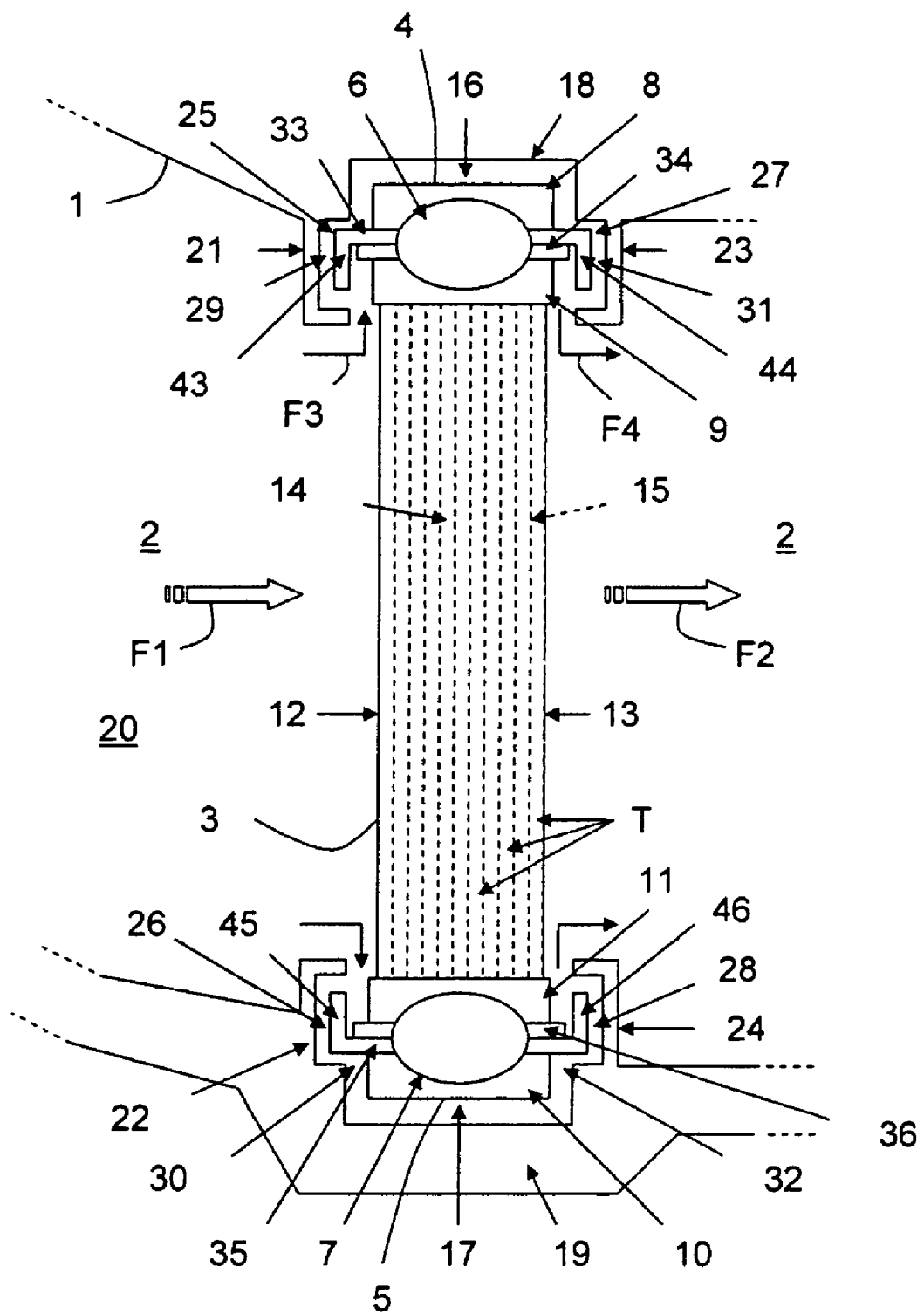
Figure 5:
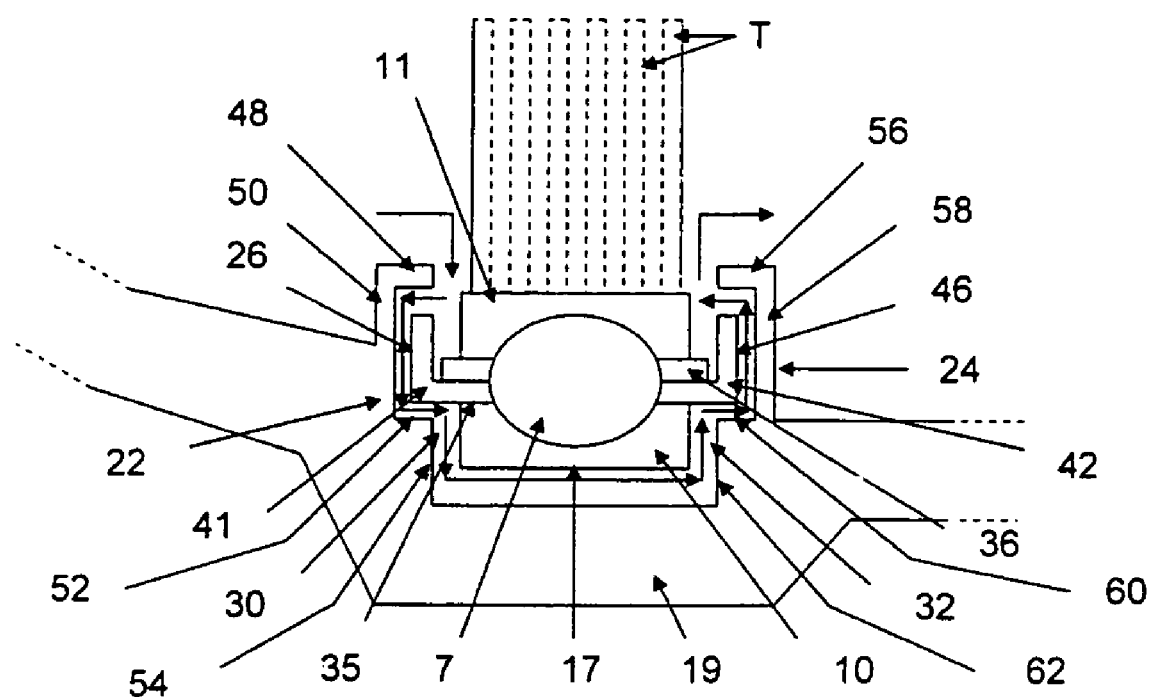

Other features and advantages of the invention will appear on examination of the following detailed description and the appended drawings in which:

FIG. 1 illustrates in schematic manner, in a view in partial section, a part of an example of a casing of a heating, ventilation and/or air conditioning installation fitted with an I-flow heat exchanger, FIG. 2 details a part of the casing of FIG. 1, relating to the invention, FIG. 3 illustrates in schematic manner, in a view in partial section, a variant of the casing of FIGS. 1 and 2, FIG. 4 illustrates in schematic manner, in a view in partial section, a part of a second example of a casing of a heating, ventilation and/or air conditioning installation, fitted with an I-flow heat exchanger, FIG. 5 details a part of the casing of FIG. 4, relating to the invention.

The appended drawings may not only serve to supplement the invention, but also contribute to its definition where appropriate.

Reference is made first of all to FIGS. 1 and 2 to describe an exemplary embodiment of an air flow treatment casing 1, according to the invention, of a heating, ventilation and/or air conditioning installation, for example of a motor vehicle passenger compartment.

The casing 1 may be installed in any part of the vehicle (front, rear, or other).

The casing 1 (very partially illustrated) is for example intended to heat an air flow originating from outside the passenger compartment and/or from inside the latter, in order to supply the vehicle's passenger compartment with warm air. For this purpose, these external and internal walls (partially represented) delimit a heating channel 2 in which is installed a heat exchanger 3, like for example a heating radiator with fluid circulation.

In the following, it is taken as an illustrative example that the heat exchanger 3 is an I-flow radiator.

It should be noted that an I-flow radiator 3 comprises two radiator tanks 4 and 5 separated from one another by a core of tubes T in which a heat transfer fluid circulates in a single direction. Consequently, one of the radiator tanks, for example 4, comprises a supply inlet 6, intended to be connected to an external circuit supplying heat transfer fluid, and the other tank, for example 5, comprises an outlet 7, intended to be connected to the external circuit.

In the example illustrated in FIGS. 1 and 2, each radiator tank consists of two complementary parts 8 and 9, on the one hand, and 10 and 11, on the other hand.

But naturally each radiator tank could consist of a single part.

The radiator 3 comprises:
- an air inlet face 12 through which the air flow to be treated (heated) F1 enters,
- an air outlet face 13 through which the treated (heated) air flow F2 emerges,
- a front end face 14 and a rear end face 15 (FIG. 1 being a top view, the front end face 14 is superposed on the rear end face 15, so that the latter 15 is not visible),
- a first side face 16 (placed perpendicular to the plane of the sheet containing FIG. 1) capped by the first radiator tank 4 (here 8 and 9), and
- a second side face 17 (placed perpendicular to the plane of the sheet containing FIG. 1) capped by the second radiator tank 5 (here 10 and 11).

The radiator 3 is installed transversely in the heating duct 2 of the casing 1, the ends of its radiator tanks 4 and 5 containing the supply inlet 6 and outlet 7 leading to the outside of said casing for the purpose of connection to the external supply circuit. In the example illustrated, the supply inlet 6 and the outlet 7 are both formed at the front end face 14. But that is not a requirement. The supply inlet 6 and/or outlet 7 may in fact be formed in the top part of the inlet face 12 or of the outlet face 13, that is to say virtually on the front end face 14.

In order to allow the radiator 3 to be installed in a transverse position, the casing 1 comprises side walls 18 and 19 each defining a housing intended to receive at least one part of one of the radiator tanks 4 and 5. The radiator 3 may thus be installed in the heating duct 2 by inserting its radiator tanks 4 and 5 into their respective housings then translating them until they abut against the rear end wall 20 of the casing 1, intended to be placed opposite its rear end face 15. Specifically, with reference to FIG. 1, the heat exchanger 3 defines a sliding direction extending between the front end face 14 and the rear end face 15 along which the heat exchanger 3 slides during installation into the casing 1. The first 21, 22 and/or second 23, 24 primary parts and the first 25, 26 and/or second 27, 28 secondary protruding parts are substantially aligned along the sliding direction between the rear end face (15) and the front end face (14) for mating during the sliding installation of the heat exchanger 3 in the casing 1.

The housings receiving the radiator tanks 4 and 5 are overdimensioned in order to take account of the production tolerances of the radiator 3. Because of this overdimensioning, a part of the incoming air flow F1 may penetrate (arrow F3) the free spaces comprised between the side walls 18 and 19 of the casing 1 and the radiator tanks 4 and 5.

The invention proposes to seal the aforementioned free spaces in original manner and durably over time. To do this, it proposes to adapt both the casing 1 and its radiator 3.

More precisely, each side wall 18, 19 is now provided with first 21, 22 and/or second 23, 24 primary parts intended to be respectively placed opposite a radiator tank side face, substantially parallel to the inlet face 12 and/or the outlet face 13 of the radiator 3. Then, each radiator tank 4, 5 comprises a first secondary part 25, 26 and/or a second secondary part 27, 28 respectively formed at least on its side faces substantially parallel to the inlet face 12 and/or the outlet face 13 of the radiator 3.

Furthermore, each first primary part 21, 22 and each corresponding first secondary part 25, 26, on the one hand, and/or each second primary part 23, 24 and each corresponding second secondary part 27, 28, on the other hand, are respectively shaped so as to define together a duct (29, 30) and/or (31, 32) constraining an air flow to change direction at least three times, in order that the circulation of the air flow is limited in the whole of the duct, and as a consequence, that its speed is slowed when skirting round the radiator tank 4, 5 concerned.

In the example illustrated in FIGS. 1 and 2, each of the first 21, 22 and second 23, 24 primary parts and each of the first 25, 26 and second 27, 28 secondary parts are shaped as indicated hereinabove. Consequently, each air flow that penetrates (arrow F3) the space comprised between the side wall 18 or 19 and the part of the radiator tank 4 or 5 (on the side of the inlet face 12) must travel along a first slowing channel 29 or 30 (forming a first "maze"), then a second slowing channel 31 or 32 (forming a second "maze"), before exiting into the heating channel 2 on the side of the outlet face 13 (arrow F4).

But, a first variant can be envisaged in which only each first primary part 21, 22 and each corresponding first secondary part 25, 26 are shaped as indicated hereinabove (a single channel 29 or 30 is then followed by the air flow), and a second variant in which only each second primary part 23, 24 and each corresponding second secondary part 27, 28 are shaped as indicated hereinabove (a single channel 31 or 32 is then followed by the air flow).

The first 21, 22 and second 23, 24 primary parts and the first 25, 26 and second 27, 28 secondary parts may have many different configurations culminating in the formation of slowing ducts 29, 30 and/or 31, 32.

It is advantageous that the first 25, 26 and second 27, 28 secondary parts consist of a particular arrangement of a peripheral edge of the radiator tanks 4, 5 and more precisely of a part of this peripheral edge, situated on the side of a side face of the radiator tank. This is particularly the case in the example illustrated in FIGS. 1 and 2. Specifically, in this example, each radiator tank 4, 5 consists of an assembly of two complementary parts (8, 9), (10, 11), at the peripheral edges (33, 34), (35, 36) that they comprise respectively. While providing that at least one of the two peripheral edges of each radiator tank protrudes at the side faces (substantially parallel to the inlet face 12 and/or the outlet face 13) this generates an obstacle which constrains the air flow to change direction several times (while interacting with the first 21, 22 and second 23, 24 primary parts of the side walls 18 and 19 of the casing 1).

In the example illustrated in FIGS. 1 and 2, it is the peripheral edges 33 and 34 of the (complementary) parts 8 and 9 of the radiator tanks that are more specially shaped. More precisely, in this example, the two peripheral edges (33, 34), (35, 36) of each radiator tank 4, 5 protrude from their two side faces over a substantially identical distance.

The total thickness, offered by the protruding parts of the two peripheral edges of each radiator tank, is used to effectively deflect the air flow.

Furthermore, in this example, the first 21, 22 and second 23, 24 primary parts are specially shaped in order to define the slowing ducts 29, 30, 31 and 32.

Such an arrangement is used to define at each radiator tank 4, 5 two slowing ducts (29, 31), (30, 32) in each of which the air flow is constrained to change direction four times (that is eight changes of direction at each radiator tank).

However, very many other conformations may be envisaged. They depend on the respective shapes of the first 21 and 22 and second 23 and 24 primary parts and of the first 25 and 26 and second 27 and 28 secondary parts.

Thus, in the example illustrated in FIG. 3, a variant of FIG. 2 has been shown in which each radiator tank 4, 5 consists of a single part furnished with a peripheral edge 37, 38 whose chosen thickness may suffice to effectively deflect the air flow.

In the example illustrated in FIGS. 4 and 5, each peripheral edge 33, 34 comprises a first part (39, 40), (41, 42), protruding on a radiator tank side face over a certain distance, substantially perpendicular to the plane containing the inlet face 12 and the outlet face 13, and extended by a second part (43, 44), (45, 46) over a certain distance and substantially parallel to the plane containing the inlet face 12 and the outlet face 13. The first parts 39 and 40 and the second parts 43 and 44 are not identified on FIGS. 4 and 5 for reasons of space, but they are equivalent to the first parts 41 and 42 and the second parts 45 and 46 illustrated in FIG. 5.

Furthermore, in this example, the first 21, 22 and second 23, 24 primary parts are specially shaped in order to define slowing ducts 29, 30, 31, 32. More precisely, each first primary portion 21, 22 comprises a first portion 47, 48 oriented substantially perpendicular to the plane containing the inlet face 12, a second portion 49, 50 oriented substantially perpendicular to the first portion 47, 48 and substantially opposite the second part 43, 44 of the peripheral edge 33, 35, a third portion 51, 52 oriented substantially perpendicular to the second portion 49, 50 and substantially opposite the first part 39, 40 of the peripheral edge 33, 35, and a fourth portion 53, 54 oriented substantially perpendicular to the third portion 51, 52. Similarly, each second primary part 23, 24 comprises a first portion 55, 56 oriented substantially perpendicular to the plane containing the outlet face 13, a second portion 57, 58 oriented substantially perpendicular to the first portion 55, 56 and substantially opposite the second part 44, 46 of the peripheral edge 33, 35, a third portion 59, 60 oriented substantially perpendicular to the second portion 57, 58 and substantially opposite the first part 40, 42 of the peripheral edge 33, 35, and a fourth portion 61, 62 oriented substantially perpendicular to the third portion 59, 60.

Such an arrangement also makes it possible to define at each radiator tank 4, 5 two slowing ducts (29, 30), (31, 32) in each of which the air flow is constrained to change direction four times (that is eight changes of direction at each radiator tank).

In order to optimize the seal, it is preferable, on the one hand, that the first 21 and 22 and/or second 23 and 24 primary parts extend substantially over the whole length of the inlet face 12 and outlet face 13, that is to say substantially between the rear end face 15 and the front end face 14, and on the other hand, that the first 25 and 26 and/or second 27 and 28 secondary parts extend substantially over the whole length of the inlet face 12 and outlet face 13. But this is not obligatory. For example, only the first primary and secondary parts may extend substantially over the whole length of the inlet face 12 and outlet face 13, or only the second primary and secondary parts may extend substantially over the whole length of the inlet face 12 and outlet face 13. It is also possible to envisage complete extensions over the whole length for some and partial extensions for the others.

In order to further reinforce the seal, it may also be envisaged to apply the principle of the invention not only to the parts of the radiator tanks 4 and 5 situated at the inlet face 12 and/or outlet face 13, but also at the rear end face 15. In this case (not illustrated), on the one hand, the casing 1 must comprise a rear end wall 20 defining two housings each intended to receive the rear end part of one of the radiator tanks 4 and 5 (opposite the end comprising the supply inlet 6 or outlet 7), and on the other hand, the rear end part of each of the radiator tanks 4, 5 must be shaped on the side of the rear end face 15. The rear end wall 20 and each rear end part are then respectively shaped so as to define together a supplementary slowing duct constraining the air flow to change direction at least three times, so that its speed is slowed while skirting round the radiator tank 4, 5 concerned.

The invention is not restricted to the casing and heat exchanger embodiments described hereinabove only as examples, but it covers all the variants that those skilled in the art might envisage in the context of the claims hereinafter.

Thus, the foregoing has described examples of casings intended to house heat exchangers comprising two radiator tanks. However, the invention equally applies to situations in which the heat exchanger comprises only one radiator tank.

The invention claimed is:

1. A casing (1) for housing, in a heating, ventilation and/or air-conditioning installation, particularly of a motor vehicle, a heat exchanger (3) comprising an air inlet face (12), an air outlet face (13), a rear end face (15), a front end face (14), and at least one side face (16, 17) capped with a radiator tank (4, 5), said casing (1) comprising walls delimiting a heating channel (2) in which is installed the heat exchanger (3), side walls (18, 19) of said heating channel each defining a housing comprising first (21, 22) and/or second (23, 24) primary parts intended to be respectively placed opposite radiator tank side faces, substantially parallel to the inlet face (12) and/or outlet face (13) and in that each radiator tank (4, 5) comprises on its side faces first (25, 26) and/or second (27, 28) secondary protruding parts, said heat exchanger (3) defining a sliding direction extending between said front end face (14) and said rear end face (15) along which said heat exchanger (3) slides during installation into said casing (1), said first and/or second primary parts and said corresponding first and/or second secondary parts being respectively shaped so as to define together a duct (29, 30; 31, 32) constraining an air flow to change direction at least three times, so that the circulation of said air flow is limited in the whole of said duct (29, 30; 31, 32), the housing being suitable for receiving at least one part of the radiator tank (4, 5) with said first (21, 22) and/or second (23, 24) primary parts and said first (25, 26) and/or second (27, 28) secondary protruding parts being substantially aligned along said sliding direction between the rear end face (15) and the front end face (14) for mating during the sliding installation of said heat exchanger (3) in said casing (1), the housing being located entirely to the exterior of the heating channel (2).

2. A casing according to claim 1, characterized in that each first primary part (21, 22) and each corresponding first secondary part (25, 26) are respectively shaped so as to define two by two a duct (29, 30) constraining said air flow to change direction at least three times.

3. A casing according to one of claim 2, characterized in that the housing comprises first (21, 22) and second (23, 24) primary parts and each second primary part (23, 24) and each corresponding second secondary part (27, 28) are respectively shaped so as to define two by two a duct (31, 32) constraining said air flow to change direction at least three times.

4. A casing according to claim 1, characterized in that the housing comprises first (21, 22) and second (23, 24) primary parts and each of said first (21, 22) and second (23, 24) primary parts and each of said corresponding first (25, 26) and second (27, 28) secondary parts are respectively shaped so as to define two by two a duct (29, 30, 31, 32) constraining an air flow to change direction at least three times.

5. A casing according to one of claims 1 to 4, characterized in that said first (21, 22) and/or second (23, 24) primary parts extend substantially over the whole length of said inlet face (12) and outlet face (13).

6. A casing according to claim 5, characterized in that said first (25, 26) and/or second (27, 28) secondary parts extend substantially over the whole length of said inlet face (12) and outlet face (13).

7. A casing according to one of claims 1 to 4, characterized in that it comprises a rear end wall (20) defining two housings each suitable for receiving a rear end part of one of said radiator tanks (4, 5) and in that said rear end part of each of said radiator tanks is shaped on the side of said rear end face (15), said rear end wall (20) and each rear end part being respectively shaped so as to define together a duct constraining said air flow to change direction at least three times, so that the circulation of the air flow is limited in the whole of the duct.

8. A casing according to claim 7, characterized in that said radiator tanks (4, 5) each comprise at least one peripheral edge (33, 34; 35, 36) and in that said first (25, 26) and/or second (27, 28) secondary parts and/or said rear end parts are protruding parts (39, 40, 41, 42; 43, 44, 45, 46) of said peripheral edges (33, 34; 35, 36).

9. A casing according to claim 8, characterized in that said protruding parts of said peripheral edges (33, 34; 35, 36) comprise a first part (39, 40, 41, 42) substantially perpendicular to said radiator tank side faces and extended by a second part (43, 44, 45, 46) substantially parallel to said radiator tank side faces.

10. A casing according to claim 1 wherein the housing slideably receives the radiator tank (4, 5).

11. A casing according to claim 1 wherein the radiator tank (4, 5) includes at least one of a supply inlet and an outlet for circulating heat transfer fluid through the radiator tank.

* * * * *